(12) United States Patent
Ackermann et al.

(10) Patent No.: US 11,781,043 B2
(45) Date of Patent: Oct. 10, 2023

(54) FULLY BONDED WATERBAR

(71) Applicant: SIKA TECHNOLOGY AG, Baar (CH)

(72) Inventors: Herbert Ackermann, Tann (CH); Roy Z'Rotz, Ebikon (CH); Christoph Fäh, Zürich (CH); Matia Bulloni, Switzerland (CH); Martin Eckl, Wädenswil (CH); Marcel Langenegger, Hedingen (CH); Patrick Bräker, Schaffhausen (CH); Roman Da Rin, Emmen (CH); Wolf-Rüdiger Huck, Gockhausen (CH); Simon Schoenbrodt, Sarnen (CH); Johannes Pecher, Alpnach Dorf (CH)

(73) Assignee: SIKA TECHNOLOGY AG, Baar (CH)

( * ) Notice: Subject to any disclaimer, the term of this patent is extended or adjusted under 35 U.S.C. 154(b) by 949 days.

(21) Appl. No.: 16/613,969

(22) PCT Filed: May 3, 2018

(86) PCT No.: PCT/EP2018/061433
§ 371 (c)(1),
(2) Date: Nov. 15, 2019

(87) PCT Pub. No.: WO2019/001805
PCT Pub. Date: Jan. 3, 2019

(65) Prior Publication Data
US 2020/0317961 A1    Oct. 8, 2020

(30) Foreign Application Priority Data

Jun. 28, 2017   (EP) ..................................... 17178523

(51) Int. Cl.
*C09J 7/35*      (2018.01)
*C09J 7/38*      (2018.01)
(Continued)

(52) U.S. Cl.
CPC ................. *C09J 7/35* (2018.01); *C08K 3/013* (2018.01); *C09J 7/385* (2018.01); *C09J 7/387* (2018.01);
(Continued)

(58) Field of Classification Search
CPC ........ E04B 1/6806; E04B 1/6813; E04B 1/66; E04B 1/68; C09J 7/35; C09J 7/385;
(Continued)

(56) References Cited

U.S. PATENT DOCUMENTS 4,740,404 A * 4/1988 Otsugu ................. E04B 1/6807
                                                        428/44
4,837,085 A * 6/1989 McGroarty ........... E04B 1/6806
                                                        428/451
(Continued)

FOREIGN PATENT DOCUMENTS

CH         700910 B1 * 11/2010 ........... E04B 1/6806
CN         1165415 C      9/2004
(Continued)

OTHER PUBLICATIONS

Jun. 1, 2018 International Search Report issued in International Patent Application No. PCT/EP2018/061433.
(Continued)

*Primary Examiner* — Adriana Figueroa
(74) *Attorney, Agent, or Firm* — Oliff PLC

(57) ABSTRACT

A sealing element for sealing joints in concrete structures including a profile having a center portion and first and second side portions on opposite sides of, the center portion. The side portions of the profile are at least partially covered with a functional coating which is operative to bond with a fresh cementitious composition casted against it and allowed to harden. A method produces a sealing element, a method seals a joint between two sections of concrete, a sealed construction, and a use of a sealing element for sealing of a joint in a concrete construction.

15 Claims, 5 Drawing Sheets

(51) Int. Cl.
*C08K 3/013* (2018.01)
*E04B 1/68* (2006.01)
*E04B 1/66* (2006.01)

(52) U.S. Cl.
CPC .......... *E04B 1/6806* (2013.01); *E04B 1/6813* (2013.01); *E04B 1/66* (2013.01); *E04B 1/68* (2013.01)

(58) Field of Classification Search
CPC .................. C09J 7/387; C09J 2301/122; C09J 2301/124; C09J 2301/204; C09J 2301/304; C09J 2301/408; C08K 3/013; B32B 25/00
See application file for complete search history.

(56) References Cited

U.S. PATENT DOCUMENTS

| | | | | |
|---|---|---|---|---|
| 5,988,648 | A * | 11/1999 | Schmid | E04B 1/6807 277/316 |
| 10,407,899 | B2 * | 9/2019 | Klein | E04B 1/6809 |
| 2015/0231863 | A1 * | 8/2015 | Knebel | B32B 5/022 428/355 R |

FOREIGN PATENT DOCUMENTS

| | | | | |
|---|---|---|---|---|
| CN | 101691739 | A | 4/2010 | |
| CN | 104583351 | A | 4/2015 | |
| DE | 29712648 | U1 * | 10/1997 | ........... B32B 25/08 |
| DE | 10 2007 026 166 | A1 | 12/2008 | |
| EP | 1 193 283 | B1 | 4/2004 | |
| KR | 20090114127 | A * | 11/2009 | |
| KR | 101372749 | B1 * | 3/2014 | |
| WO | WO-9622429 | A1 * | 7/1996 | ........... E04B 1/6806 |
| WO | 2011/023768 | A1 | 3/2011 | |
| WO | 2011/033122 | A1 | 3/2011 | |
| WO | 2014/029763 | A1 | 2/2014 | |
| WO | 2016/139345 | A1 | 9/2016 | |
| WO | 2017/108843 | A1 | 6/2017 | |
| WO | 2017/174522 | A1 | 10/2017 | |

OTHER PUBLICATIONS

Jun. 1, 2018 Written Opinion of the International Searching Authority issued in International Patent Application No. PCT/EP2018/061433.

* cited by examiner

FULLY BONDED WATERBAR

TECHNICAL FIELD

The invention relates to sealing elements and use thereof for sealing of concrete joints against penetration of water. In particular, the present invention relates to sealing elements suitable for sealing of joints formed between sequentially casted sections of concrete. Such sealing elements are commonly known as waterbars and waterstops.

BACKGROUND ART

Polymeric sheets, which are often referred to as waterproofing membranes, are commonly used in the construction industry for sealing bases, underground surfaces or buildings against water penetration. Waterproofing membranes are applied, for example, to prevent ingress of water through cracks that develop in the concrete structure due to building settlement, load deflection or concrete shrinkage. Furthermore, large concrete structures, such as slabs, dams, tanks, and foundations, cannot be casted as one monolithic unit and, therefore, they contain a number of joints formed between the concrete bodies. These concrete joints also have to be sealed to prevent passage of water into and through the joint.

Waterproof profiles, also known as waterbars or waterstops, are commonly used for sealing of concrete joints. They are provided in a range of different compositions, shapes and sizes to suit different types of concrete structures and sealing applications. Joints are provided between adjacent concrete bodies to accommodate expected physical changes of concrete when subjected to environmental and mechanical conditions or to assist in the construction and placement of concrete. Physical changes may result from drying, shrinkage, carbonation, or creep of the concrete mass or from a load applied on the concrete body. In the latter case the joint can be formed, for example, due to a scheduled or unscheduled interruption in concrete placement.

Expansion joints are formed in concrete structures at regular intervals to accommodate the movement caused by expansion of concrete mass. Expansion joints are also commonly designed to isolate structural elements from each other, such as walls or columns from floors and roofs, pavement from bride decks, or where wall elements change directions. Contraction joints are used to regulate the cracking that occurs due to unavoidable and unpredictable contraction during hardening of concrete. Contraction joints may be made during casting of the concrete by forming the joint with a plate or after construction by cutting the joint. Construction joints are created at certain locations during massive concrete placements due to scheduled or unscheduled interruptions. In this case the concrete bodies are not expected to have dimensional changes and, therefore, construction joints are not provided with a predetermined expansion gap.

State-of-the-Art waterstops are strip-like profiles having a center portion, which is positioned along or inside the concrete joint, and two side portions or side flanges located on opposite sides of the center portion. Waterstops are provided in various shapes and sizes to adapt to the requirements of the sealing application. Flat and dumbbell-shaped waterstops are typically used for sealing of construction and contraction joints whereas waterstops with an expansion element such as a "centerbulb" are used for sealing of expansion joints. The centerbulb is typically provided as a hollow profile, which allows wider range of movement in transverse, lateral, or shear directions without excessively stretching the material.

Unlikely most other types of sealing elements that are applied in place after construction, waterstops are typically installed prior to casting of the concrete structure. Furthermore, a waterstop can be installed as an external sealing element, in which case the side flanges are embedded in the rear face of the concrete or an internal sealing element, in which case the side flanges of the waterstop are completely embedded in concrete. The installation of an external waterstop typically comprises steps of placing the waterstop on a base and casting the sections of concrete such that the side flanges become embedded in rear faces of the casted concrete bodies and the center portion is situated along the formed concrete joint. External waterstops are equally suitable for sealing of expansion, construction, and contraction joints.

In installation of an internal sealing element, the waterstop is placed inside the joint to be formed after casting of concrete such that the center portion is positioned in the middle of the planned concrete joint. The Installation of an internal waterstop can be conducted, for example, by using a split formwork, which allows the insertion of the waterstop through the formwork. Typically, at least one of the side flanges is fixed to reinforcing steel bars in order to prevent undesired movement of the waterstop during casting of concrete. After casting of the first section of concrete, the formwork is removed followed by casting of the second section of concrete. In case an expansion joint, an expansion or filler board is typically positioned in the joint opening after the formwork has been removed and before casting of the second section of concrete. Such expansion boards are composed of compressible materials, such as foam- and fiber-based materials and they absorb the expansion and contraction movements of the adjacent concrete bodies. The construction of a split formwork is generally considered to be difficult since the formwork has to be provided with a recess to accommodate the waterstop during casting of the first section of concrete. Use of split formworks can be avoided, for example, by using split waterstops. In this case, one of the side flanges is split in two parts to allow the flange to be fastened along the vertical surface of a continuous formwork. After casting of the first section of concrete, the formwork is removed and the parts of the split side flange are bonded together prior to casting of second section of concrete.

Typically used materials for waterstops include metals and in particular non-metallic materials, such as butyl rubber, nitrile rubber, and EPDM rubber as well as thermoplastics such as PVC. These materials do not adhere with concrete and, therefore, the side flanges of waterstops are provided with multiple raised ribs, fins, or other protrusions, which provide mechanical bond or interlock in the concrete structures and mechanical seal against flow of water when embedded in the concrete. Strip-like profiles composed of thermoplastic materials can be easily produced by extrusion techniques but the complexity of the shapes of the laterally extending flanges complicates the production process and increases the production costs. Furthermore, waterstops are typically composed of relatively stiff materials to provide effective anchoring of the side portions to concrete structures by means of raised ribs and other protrusions. Due to the stiffness of material the waterstops cannot be stored in form of rolls like waterproofing membranes, which increases the amount of space required for storing of these types of sealing elements.

There is thus a need for a novel type of waterstop, which can be produced with reduced costs and which enables improved sealing of joints formed between casted sections of concrete.

SUMMARY OF THE INVENTION

The objective of the present invention is to provide a sealing element suitable for sealing of concrete joints formed between casted sections of concrete, which sealing element can be produced with decreased costs compared to the State-of-the-Art sealing elements.

Another object of the present invention is to provide a sealing element, which unlike State-of-the-Art waterstops can easily be stored in form of rolls.

It was surprisingly found that a sealing element comprising a profile having a center portion and two side portions on opposite sides of the center portion, which side portions are at least partially covered with a functional coating, which is operative to bond with a fresh cementitious composition casted against it and allowed to harden, is able to solve or at least mitigate the problems related to State-of-the-Art waterproofing systems.

The subject of the present invention is a sealing element as defined in claim 1.

One of the advantages of the sealing element of the present invention is that since the side portions of the sealing element can be anchored to the concrete structures without the use of ribs or other keying formations, the sealing element can be produced with a simplified shape, which significantly decreases the production costs.

Another advantage of the sealing element of the present invention is that the sealing element can be provided with reduced dimensions, in particular with reduced length since the functional coating enables permanent bonding with casted concrete after hardening.

A still another advantage of the present invention is that sealing element can be produced using flexible material compositions, which enables storing of the sealing elements in form of rolls.

Other aspects of the present invention are presented in other independent claims. Preferred aspects of the invention are presented in the dependent claims.

DETAILED DESCRIPTION OF THE INVENTION

Figure 1:
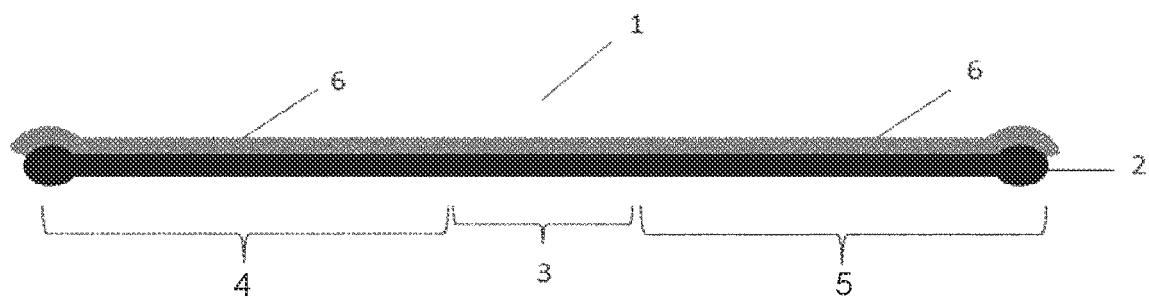
FIG. 1 shows a cross-section of a sealing element (1) according to one embodiment of the present invention. In this embodiment, the side portions (4, 5) of the profile (2) are in form of planar elements, wherein the extremities of the side portions (4, 5) are terminated by bulb-shaped protuberances. The center portion (3) of the profile (2) is in a form of a planar element and the top major surfaces of the side portions (4, 5) are substantially completely covered with the functional coating (6).

The subject of the present invention is a sealing element (1) for sealing of joints in concrete structures, the sealing element (1) comprising:

a profile (2) having a center portion (3) and first and second side portions (4, 5) on opposite sides of the center portion (3), the side portions (4, 5) having top and bottom major surfaces, wherein at least one of the top and bottom major surfaces of the first and/or second side portions (4, 5) is at least partially covered with a functional coating (6) which is operative to bond with a fresh cementitious composition casted against it and allowed to harden, and wherein the center portion (3) is in a form of a planar element having top and bottom major surfaces or the center portion (3) is in a form of an expansion element.

Substance names beginning with "poly" designate in the present document substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "α-olefin" designates an alkene having the molecular formula $C_xH_{2x}$ (x corresponds to the number of carbon atoms), which features a carbon-carbon double bond at the first carbon atom (α-carbon). Examples of α-olefins include ethylene, propylene, 1-butene, 2-methyl-1-propene (isobutylene), 1-pentene, 1-hexene, 1-heptene and 1-octene. For example, neither 1,3-butadiene, nor 2-butene, nor styrene are referred as "α-olefins" according to the present document.

The term "poly-α-olefin" designates homopolymers and copolymers obtained by polymerization or oligomerization of α-olefins or multiple distinct α-olefins.

The term "(meth)acrylic" designates both methacrylic or acrylic. Accordingly, the term "(meth)acrylate designates both acrylates and methacrylates.

The term "dispersion" refers to a physical state of matter that includes at least two distinct phases, wherein a first phase is distributed in a second phase, with the second phase being a continuous medium. In particular, the dispersion comprises a solid phase which is dispersed as solid particles in a continuous liquid phase.

The term "molecular weight" refers to the molar mass (g/mol) of a molecule or a part of a molecule, also referred to as "moiety". The term "average molecular weight" refers to number average molecular weight (Mn) of an oligomeric or polymeric mixture of molecules or moieties. The molecular weight may be determined by gel permeation chromatography.

The term "softening point" refers to a temperature at which compound softens in a rubber-like state, or a temperature at which the crystalline portion within the compound melts. The softening point can be determined by ring and ball measurement conducted according to DIN EN 1238 standard.

The term "melting temperature" refers to a crystalline melting point ($T_m$) as determined by differential scanning calorimetry (DSC) by using the method as defined in ISO 11357 standard using a heating rate of 2° C./min. The measurements can be performed with a Mettler Toledo DSC 3+ device and the $T_g$ values can be determined from the measured DSC-curve with the help of the DSC-software.

The term "glass transition temperature" ($T_g$) designates the temperature above which temperature a polymer component becomes soft and pliable, and below which it becomes hard and glassy. The glass transition temperature is preferably determined differential scanning calorimetry method (DSC) according to ISO 11357 standard using a heating rate of 2° C./min. The measurements can be performed with a Mettler Toledo DSC 3+ device and the $T_g$ values can be determined from the measured DSC-curve with the help of the DSC-software.

The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

The "amount or content of at least one component X" in a composition, for example "the amount of the at least one thermoplastic polymer P1" refers to the sum of the individual amounts of all thermoplastic polymers P1 contained in the composition. Furthermore, in case the composition comprises 20 wt.-% of at least one thermoplastic polymer P1, the sum of the amounts of all thermoplastic polymers P1 contained in the composition equals 20 wt.-%.

The term "normal room temperature" refers to the temperature of 23° C.

The sealing element of the present invention comprises a profile having a center portion and first and second side portions on opposite sides of the center portion. Preferably, the side portions are extending outwardly from, and on opposite sides of, the center portion. The profile is preferably in form of a continuous strip of material having top and bottom major surfaces limited by peripheral edges defining the dimensions of the profile.

The side portions of the sealing element have top and bottom major surfaces at least one of which is at least partially covered with a functional coating, which is operative to bond with a cementitious composition casted against it and allowed to harden. The term "operative to bond with a cementitious composition" is understood to mean that that the functional coating forms a permanent bond to a cementitious composition casted against it after hardening.

The term "cementitious composition" designates concrete, shotcrete, grout, mortar, paste or a combination thereof. The terms "paste", "mortar", "concrete", "shotcrete", and "grout" are well-known terms in the state-of-the-art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a hydratable cement, water, and fine and/or coarse aggregate, to produce the particular cementitious composition. The term "fresh cementitious composition" or "liquid cementitious composition" designate cementitious compositions before hardening, particularly before setting.

The functional coating covering at least part of the at least one of the top and bottom major surfaces of the first and/or second side portions and the profile of the sealing element can be directly or indirectly connected to each other, preferably bonded to each other over their opposing surfaces. The expression "directly bonded" is understood to mean in the context of the present invention that no further layer or substance is present between the layers, and that the opposing surfaces of the layers are directly bonded to each other or adhere to each other. At the transition area between the two layers, the materials of the layers can also be present mixed with each other. The opposing surfaces of the functional coating and the profile of the sealing element can be directly bonded to each other, for example, through thermal bonding or indirectly through a connecting layer, such as a layer of adhesive or a layer of a thermoplastic material, or a combination thereof.

According to one or more embodiments, the extremities of the side portions are terminated by a bulb-shaped protuberance, which act as additional anchoring means for the sealing element installed in a concrete structure. The size of the bulb-shaped protuberances is not particularly restricted. It may be advantageous that they have a diameter, which exceeds at least by 100%, preferably at least by 150%, more preferably at least by 200% the thickness of the respective side portion. Preferably, the bulb-shaped protuberances have a solid core composed of the same material as the profile of the sealing element.

According to one or more embodiments, the first and second side portions are essentially free of keying formations, such as raised ribs, fins of other keying formations extending in a direction perpendicular to the plane of the sealing element and having a height, which significantly exceeds the thickness of the side portions. The wording "significantly exceed" is understood to mean that the height of a keying formation exceeds at least by 75%, preferably at least by 100%, more preferably at least by 150% the thickness of the respective side portion. These types of keying formations are typically used in State-of-the-Art waterstops to anchor the side portions to concrete structures. Presence of other types of keying formations having a height, which does not significantly exceed the thickness of the side portions, is, however, entirely possible even though not necessarily preferred.

According to one or more embodiments, the first and second side portions are in form of planar elements. The term "planar" designates in the present document sheet-like elements having a length and width at least 10 times, preferably at least 25 times, more preferably at least 50 times, greater than the thickness of the element. Furthermore, the term "planar" is understood to mean that the surface of the element is relatively smooth, i.e. the element is essentially free of raised ribs, fins and other keying formations, which are typically used in State-of-the-Art waterstops to anchor the side flanges to concrete structures.

According to one or more embodiments, at least one of the top and bottom major surfaces of the first and second side portions of the profile is at least partially covered with the functional coating. It may, for example, be preferred that the top major surfaces of the first and second side portions are at least partially covered with the functional coating, wherein neither of the bottom major surfaces of the first and second side portions are covered with the functional coating, or vice versa. Sealing elements according to these embodiments are especially suitable for use as external waterstops, which are installed to a concrete joint such that only one of the top or bottom major surfaces of the side portions is bonded to the surface of the concrete structure.

It may also be preferred that substantially the entire area of at least one of the top and bottom major surfaces of the first and second side portions is covered with the functional coating. It may, for example, be preferred that at least 70%, more preferably at least 80%, most preferably at least 90%, of the entire surface area of at least one of the top and bottom major surfaces of the first and second side portions, respectively, is covered with the functional coating. Furthermore, it may be preferable that substantially the entire areas, such as at least 70%, more preferably at least 80%, most preferably at least 90%, of the top major surfaces of the first and second side portions, respectively, are covered with the functional coating, wherein neither of the bottom major surfaces of the first and second side portions are covered with the functional coating, or vice versa.

According to one or more further embodiments, the top and bottom major surfaces of the first and second side portions are at least partially covered with a functional coating. Sealing elements according to these embodiments are especially suitable for use as internal waterstops, which are installed inside a concrete joint such that both the top or bottom major surfaces of the side portions are bonded to the surface of the concrete structure. Also in this case it may be preferred that substantially the entire area of the top and bottom major surfaces of the first and second side portions is covered with the functional coating. It may, for example, be preferable that at least 70%, more preferably at least 80%, most preferably at least 90%, of the entire surface area of the top and bottom major surfaces of the first and second side portions, respectively, is covered with the functional coating According to one or more embodiments, the center portion of the profile is in a form of a planar element having top and bottom major surfaces. Sealing elements according to these embodiments may be more suitable for sealing of construction and contraction joints than for sealing of expansion joints. In these embodiments it may be preferable that the profile has uniform thickness along the entire length of the sealing element, i.e. the first and second side portions have substantially same thickness as the center portion. However, it is equally possible that the center portion has a different thickness than the side portions.

According to one or more embodiments, the center portion of the profile is in a form of a planar element having top and bottom major surfaces neither of which is covered with the functional coating. In these embodiments it may also be preferable that the profile has uniform thickness along the entire length of the sealing element, i.e. the first and second side portions have substantially same thickness as the center portion. However, it is equally possible that the center portion has a different thickness than the side portions.

According to one or more embodiments, the center portion of the profile is in a form of an expansion element. Sealing elements according to these embodiments are particularly suitable for sealing of expansion joints. The type of the expansion element is not particularly restricted but it should enable accommodation of joint expansion and contraction caused by lateral and/or transverse movements of the casted concrete sections. The expansion element can be composed of the same or different material than the first and second side portions of the profile.

Preferably, the expansion element has a greater elastic ability than the first and second side portions. The term "greater elastic ability" is understood to mean that the element exhibits a larger elastic deformation range, i.e. the element can be subjected to larger amount of stretching while still being able to recover to its original shape.

According to one or more embodiments, the center portion is in a form of an expansion element, which is configured such that it is capable of stretching in lateral and/or transverse direction beyond the normal elastic ability of the material of which it is made of. This type of expansion element can be in any provided in any suitable form, such as in form of a hollow profile having a closed or open cross section, such as an arch-, bellows-, or loop-shaped cross-section. These types of expansion elements allow a wider range of movement in transverse, lateral or shear directions than a planar element composed of the same material. They also enable greater amount of movement without excessively stretching the material.

According to one or more embodiments, the expansion element is in a form of a hollow profile having a closed cross-section and inner and outer major surfaces. These types of expansion elements are commonly known as "center bulbs". The type of the closed cross-section of the hollow profile is not particularly restricted. It may be, for example, preferable that the hollow profile has a circular-, oval-, hexagonal-, pentagonal-, square, or triangular-shaped cross section. The inner and outer major surfaces of the expansion element and the functional coating can be directly or indirectly bonded to each other. In these embodiments it may be preferable that at least the inner major surface of the expansion element is not covered with the functional coating.

Instead of a center bulb, the expansion element may also be provided in form a hollow profile having an open cross-section. According to one or more embodiments, the expansion element is in a form of a hollow profile having an open cross-section and top and bottom major surfaces. These types of cross-sections may be preferred, for example, in order to enable a simplified production process of the sealing element. The type of the open cross-section of the hollow profile is not particularly restricted. It may be, for example, preferable that the hollow profile has U-, V-, Z-, or W-shaped cross-section or a loop-, an arch-, or a bellows-shaped cross-section. In these embodiments it may be preferable that at least one of the top and bottom major surfaces of the expansion element is at least partially covered with the functional coating. The top and bottom major surfaces of the expansion element and the functional coating can be directly or indirectly bonded to each other. According to one or more embodiments, the top and bottom major surfaces of the expansion element are at least partially covered with the functional coating.

The composition of the profile of the sealing element is not particularly restricted. However, the material of the profile should be selected such that the sealing element fulfils the general requirements for waterstops used for sealing of expansion, contraction, or construction joints in concrete structures. It may be preferable, for example, that the material of the profile is selected such that the sealing element fulfils, depending on the application range, the requirements as defined in the following standards: DIN 18541, BS 903, BS 2571, CRD-C 572-74, ASTM D 412-75, and ASTM D 638.

Preferably, the profile of the sealing element is composed of a first composition comprising at least one thermoplastic polymer P1.

It may be preferable that the at least one thermoplastic polymer P1 is present in the first composition in an amount of at least 15 wt.-%, more preferably at least 25 wt.-%, most preferably at least 35 wt.-%, based on the total weight of the first composition. According to one or more embodiments, the at least one thermoplastic polymer P1 is present in the first composition in an amount of at least 50 wt.-%, preferably at least 60 wt.-%, more preferably at least 70 wt.-%, most preferably at least 85 wt.-%, based on the total weight of the first composition.

According to one or more embodiments, the at least one thermoplastic polymer P1 is selected from the group consisting of ethylene—vinyl acetate copolymers (EVA), ethylene—acrylic ester copolymers, ethylene—α-olefin copolymers, ethylene—propylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB).

The profile can comprise, in addition to the at least one thermoplastic polymer P1, auxiliary components, for example, UV- and heat stabilizers, antioxidants, plasticizers, flame retardants, fillers, dyes, pigments such as titanium dioxide and carbon black, matting agents, antistatic agents, impact modifiers, biocides, and processing aids such as lubricants, slip agents, antiblock agents, and denest aids. The total amount of the auxiliary components is preferably not more than 35 wt.-%, more preferably not more than 25 wt.-%, most preferably not more than 15 wt.-%, based on the total weight of the first composition.

The composition of the functional coating is not particularly restricted in the present invention. Any type of functional coating, which is operative to bond with a fresh cementitious composition casted against it and allowed to harden, is in principle suitable. Suitable functional coatings to be used in the present invention are disclosed, for example, in EP 1 193283 B1, WO 2014/029763 A1, WO 2011/033122 A1, and WO2017/108843 A1.

According to one or more embodiments, the functional coating comprises:
A first adhesive and a contact mediator or
At least one thermoplastic polymer P2 and at least one solid particulate filler F, wherein the particles of the at least one solid particulate filler F are distributed throughout the entire volume of the functional coating, or
At least one thermoplastic polymer P3, which changes its consistency under the influence of highly alkaline medium and a second adhesive.

According to one or more embodiments, the functional coating comprises a first adhesive and a contact mediator. It may be preferred that the contact mediator is adhesively bonded to the profile with the first adhesive. The term "adhesively bonded" is understood to mean bonding by formation of a mechanical link between the substrates. The formation of mechanical link can be based on surface adsorption, chemical bonding, diffusion, electrostatic attraction, or mechanical interlocking processes. Thus, for example, a molten thermoplastic component, which penetrates in a molten state into pores or spaces of a substrate and then solidifies and thus anchors with or in the substrate, is referred as "adhesively bonded".

According to one or more embodiments, the first adhesive is a pressure sensitive adhesive (PSA) or a hot-melt adhesive. The term "pressure sensitive adhesive" is understood to include also pressure sensitive hot-melt adhesives (HM-PSA).

Suitable pressure sensitive adhesives include compositions based on acrylic polymers, styrene block copolymers, amorphous polyolefins (APO), amorphous poly-alpha-olefins (APAO), vinyl ether polymers, bitumen, elastomers such as, for example, butyl rubber, ethylene vinyl acetate, natural rubber, nitrile rubber, silicone rubber, and ethylene-propylene-diene rubber. In addition to the above mentioned polymers, suitable pressure sensitive adhesive compositions typically comprise one or more additional constituents including, for example, tackifying resins, waxes, and plasticizers as wells as one or more additives such as, for example, UV-light absorption agents, UV- and heat stabilizers, optical brighteners, pigments, dyes, and desiccants.

According to one embodiment, the first adhesive is a styrene block copolymer-based pressure sensitive adhesive or styrene block copolymer-based pressure sensitive hot-melt adhesive comprising at least one styrene block copolymer.

Suitable styrene block copolymers include block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks.

Preferably, the at least one styrene block copolymer is selected from the group consisting of SBS, SIS, SIBS, SEBS, and SEPS block copolymers. These can have a linear, radial, diblock, triblock or star structure, linear structure being preferred. Suitable styrene block copolymers of the SXS type include block copolymers based on saturated or unsaturated middle blocks X. Hydrogenated styrene block copolymers are also suitable. The at least one styrene block copolymer may be present in the pressure sensitive adhesive in an amount of 5-60 wt.-%, more preferably 10-55 wt.-%, most preferably 20-50 wt.-%, based on the total weight of the adhesive.

The pressure sensitive adhesive preferably further comprises at least one tackifying resin. The term "tackifying resin" designates in the present document resins that in general enhance the adhesion and/or tackiness of an adhesive composition. The term "tackiness" designates in the present document the property of a substance of being sticky or adhesive by simple contact. The tackiness can be measured, for example, as a loop tack. Preferred tackifying resins are tackifying at a temperature of 25° C.

Suitable tackifying resins include synthetic resins, natural resins, and chemically modified natural resins. The at least one tackifying resin may be present in the pressure sensitive adhesive in an amount of 5-60 wt.-%, preferably 10-55 wt.-%, most preferably 20-50 wt.-%, based on the total weight of the adhesive.

According to one or more further embodiments, the first adhesive is pressure sensitive bituminous adhesive. Such bituminous adhesives are well known to a person skilled in the art. These are pressure sensitive adhesives comprising polymer modified bitumen and additives such as processing oils and fillers. Suitable processing oils include, for example, mineral oils, synthetic oils, and paraffins. The term "mineral oil" refers to any hydrocarbon liquid of lubricating viscosity (i.e., a kinematic viscosity at 100° C. of 1 cSt or more) derived from petroleum crude oil and subjected to one or more refining and/or hydroprocessing steps, such as fractionation, hydrocracking, dewaxing, isomerization, and hydrofinishing, to purify and chemically modify the components to achieve a final set of properties. They can be characterized as either "paraffinic", "naphthenic", or "aromatic" based on the relative content of paraffinic, naphthenic, and aromatic moieties therein. Such bituminous adhesives can be prepared by melting bitumen and mixing the other ingredients into the molten bitumen mass.

The bitumen component contained in the pressure sensitive bituminous adhesive is typically modified with one or more polymer components in order to improve the mechanical properties of the adhesive Typical polymers used in bituminous adhesives include atactic polypropylenes (APP), amorphous polyolefins (APO), styrene block copolymers, in particular SIS, SBS, and SEBS, as well as rubbers, in particular styrene-butadiene rubber (SBR), EPDM, polyisoprene, polybutadiene, natural rubber, polychloroprene rubber, ethylene-propylene rubber, ethylene alpha olefin, nitrile rubbers, and acrylic rubber. The term "amorphous polyolefin" refers to a polyolefin with a degree of crystallinity of less than 30% measured by differential scanning calorimetry (DSC) conducted according to ISO 11357 standard. Suitable amorphous polyolefins include, for example, homopolymers of propylene or copolymers of propylene with one or more α-olefin comonomer, such as, for example, ethylene, 1-butene, 1-hexene, 1-octene and 1-decene.

According to one or more embodiments, the pressure sensitive bituminous adhesive comprises 20-90 wt.-%, preferably 35-85 wt.-% of bitumen and 5-30 wt.-%, preferably 10-25 wt.-% of at least one rubber, and 0-40 wt.-%, preferably 0-35 wt.-% of at least one processing oil, preferably at least one mineral oil. The pressure sensitive bituminous adhesive may further comprise not more than 50 wt.-%, preferably not more than 40 wt.-%, of at least one inorganic filler, preferably an inorganic filler selected from the group consisting of silica, calcium carbonate, talc, or clay.

According to one or more embodiments, the first adhesive is a hot-melt adhesive. Hot-melt adhesives are solvent free adhesives, which are solid at room temperature and which are applied to the substrate to be bonded in form of a melt. After cooling the adhesive solidifies and forms an adhesive bond with the substrate through physically and/or chemically occurring bonding. Suitable hot-melt adhesives include, for example, polyolefin-based hot-melt adhesives, in particular those based on amorphous polyolefins (APO) and amorphous poly-alpha-olefins (APAO), and polyurethane-based hot-melt adhesives. These types of hot-melt adhesives are well known to a person skilled in the art. They typically contain, in addition to the main polymer component, hydrocarbon resins and/or polyolefin waxes. Suitable hot-melt adhesives to be used as the first adhesive are disclosed, for example, in WO 2011/023768 A1, WO 2016/139345 A1, and WO 2017/174522 A1.

According to one or more embodiments, the first adhesive is a hot-melt adhesive having a softening point determined by Ring and Ball measurement conducted according to DIN EN 1238 standard of 50-190° C., preferably 60-150° C., more preferably 70-120° C.

According to one or more embodiments, the contact mediator is a layer of fiber material. The term "fiber material" designates in the present document materials composed of fibers. Suitable fibers to be used in the support sheet can comprise or consist of organic, inorganic or synthetic organic materials or any combination thereof. Suitable organic fibers include, for example, cellulose fibers, cotton fibers, and protein fibers. Suitable synthetic organic fibers include, for example, fibers composed of polyester, homopolymers and copolymers of ethylene and/or propylene, viscose, nylon, and polyamides. Fiber materials composed of inorganic fibers are also suitable, in particular, those composed of mineral fibers, such as glass fibers, aramid fibers, wollastonite fibers, and carbon fibers. Inorganic fibers, which have been surface treated, for example, with silanes, may also be used. The fiber material can comprise short fibers, long fibers, spun fibers (yarns), or filaments. The fibers can moreover be aligned or drawn fibers. It may also be advantageous to use a combination of different types of fibers, both in terms of geometry and composition.

Suitable fiber materials to be used as the contact mediator include non-woven fabrics, woven fabrics, and non-woven scrims.

The term "non-woven fabric" designates in the present document materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a non-woven fabric.

The term "non-woven scrim" designates in the present document web-like non-woven products composed of yarns, which lay on top of each other and are chemically bonded to each other. Typical materials for non-woven scrims include metals, fiberglass, and plastics, in particular polyester, polypropylene, polyethylene, and polyethylene terephthalate (PET).

Particularly suitable layers of fiber material to be used as the contact mediator include non-woven fabric layers composed of synthetic organic or inorganic fibers, wherein the synthetic organic fibers are preferably selected from the group consisting of polyester fibers, polypropylene fibers, polyethylene fibers, nylon fibers, and polyamide fibers.

According to one or more further embodiments, contact mediator comprises or is composed of inorganic particles coated as a discrete layer on a layer of the first adhesive. In these embodiments, some part of the inorganic particles forming the discrete layer may be fully embedded into the layer of the first adhesive whereas majority of the particles are only partially embedded into the layer of the first adhesive. The inorganic particles that are partially embedded into the layer of the first adhesive are also partially exposed and may, therefore, get into contact with a fresh cementitious composition casted against the functional coating. This may contribute to the ability of the functional coating to form a permanent bond with fresh cementitious compositions after hardening.

Suitable inorganic particles to be used for the contact mediator include in particular mineral binder particles. The term "mineral binder" designates in the present document binders, which in the presence of water react in a hydration reaction under formation of solid hydrates or hydrate phases. In particular, the term "mineral binder" refers in the present document to non-hydrated mineral binders, i.e. mineral binders, which have not been reacted in a hydration reaction and/or which are capable of undergoing a hydration reaction in the presence of water. Suitable mineral binders include hydraulic, non-hydraulic, latent hydraulic, and pozzolanic binders.

The term "hydraulic binder" designates in the present document substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength.

The term "gypsum" designates in the present document any known form of gypsum, in particular calcium sulfate dehydrate, calcium sulfate α-hemihydrate, calcium sulfate β-hemihydrate, or calcium sulfate anhydrite or mixtures thereof.

The term "latent hydraulic binder" designates in the present document particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in the present document in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

The inorganic particles are preferably in the form of finely divided particles. The term "finely divided particles" refers to particles, whose median particle size $d_{50}$ does not exceed 500 μm. The term median particle size $d_{50}$ refers to a particle size below which 50% of all particles by volume are smaller than the $d_{50}$ value. Preferably, the overall particle size of the inorganic particles (of at least 98% of the particles) is below 250 μm, more preferably below 200 μm, even more preferably below 100 μm.

According to one or more embodiments, the inorganic particles comprise or are composed of cement particles or Portland cement clinker particles.

The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

According to one or more further embodiments, contact mediator is a layer produced from an aqueous dispersion of at least one acrylic polymer. The term "acrylic polymer" refers in the present document to homopolymers, copolymers and higher inter-polymers of an acrylic monomer with one or more further acrylic monomers and/or with one or more other ethylenically unsaturated monomers. The term "acrylic monomer" refers in the present document to (meth) acrylates, (meth)acrylic acid, and to derivatives thereof, for example, amides of (meth)acrylic acid or nitriles of (meth) acrylic acid. Preferred acrylic polymers contain at least 30 wt.-%, more preferably at least 40 wt.-%, most preferably at least 50 wt.-% of acrylic monomers. The term "aqueous composition" refers in the present document to a composition in which water is the primary dissolving medium or solvent. Preferably, the "aqueous composition" refers to a composition, in which water is the only dissolving medium or solvent.

Particularly suitable acrylic polymers for the aqueous dispersion consist for the most part of (meth)acrylates of alcohols containing from 1 to 24 carbon atoms. Preferred acrylic polymers contain, as polymerized units, at least 25 wt.-%, more preferably at least 50 wt.-%, most preferably at least 75 wt.-% of these acrylic monomers. Suitable ethylenically unsaturated monomers that can be used as comonomers with the acrylic monomers include, for example, vinyl esters and allyl esters of carboxylic acids containing from 1 to 20 carbon atoms, vinyl ethers of alcohols containing from 1 to 8 carbon atoms, vinyl aromatic compounds, in particular styrene, vinyl halides, non-aromatic hydrocarbons containing from 2 to 8 carbon atoms and at least one olefinic double bond, a and β-unsaturated mono- or di-carboxylic acids containing from 3 to 6 carbon atoms, and derivatives thereof (especially amides, esters and salts).

Preferably the at least one acrylic polymer has a glass transition temperature ($T_g$) in the range of –40-5° C., more preferably –40-0° C. Suitable aqueous dispersions of acrylic polymers are commercially available, for example, from BASF such as Arconal® A200, Arconal® A323, Arconal® A378, Arconal® 380, Arconal® 5036, Arconal® 5041, Arconal® 6767, Arconal® S 410, Arconal® S 559, Arconal® 5047, Acronal® V275, Acronal® V278; from APP such as Airflex® EAF 60 and Airflex® EAF 67; from Clariant such as Mowilith® DM 1340; from Rohm and Haas such as Primal® CA 162 and Primal® CA 172.

The aqueous polymer dispersion can comprise two or more different acrylic polymers having different glass transition temperatures and different monomer compositions. Aqueous polymer dispersions comprising two or more different acrylic polymers can be prepared by mixing commercially available acrylic polymer dispersions, such as those described above.

The layer produced from an aqueous dispersion of at least one acrylic polymer can further comprise additives, such as such as inorganic fillers, UV- and heat stabilizers, UV-absorbers, antioxidants, surfactants, dyes, pigments such as titanium dioxide and carbon black, antistatic agents, impact modifiers, biocides, defoamers, wetting agents, coalescing agents, and processing aids such as lubricants, slip agents, antiblock agents, and denest aids.

According to one or more further embodiments, the functional coating is composed of a second composition comprising at least one thermoplastic polymer P2 and at least one solid particulate filler F, wherein the particles of the at least one solid particulate filler F are distributed throughout the entire volume of the functional coating. The term "distributed throughout the volume" is understood to mean that essentially all portions of the functional coating contain particles of the solid particulate filler F but it does not necessarily imply that the distribution of the particles is completely uniform throughout the functional coating.

In embodiments wherein the functional coating is composed of the second composition, the functional coating and the profile of the sealing element can be directly or indirectly bonded to each other over their opposing surfaces. In particular the functional coating can be directly or indirectly bonded to the top and/or bottom major surfaces of the side portions and/or to at least part of the top and/bottom major surfaces or inner and outer major surfaces of the center portion, if applicable. The functional coating and the profile of the sealing element can be directly bonded to each other, for example, though thermal bonding or indirectly, for example, though a connecting layer, such as a layer of adhesive or a layer of thermoplastic material or a combination thereof.

According to one or more embodiments, the functional coating is composed of a second composition comprising at least one thermoplastic polymer P2 and at least one solid particulate filler F, wherein the particles of the at least one solid particulate filler F are distributed throughout the entire volume of the functional coating and wherein the functional coating and the profile of the sealing element are directly bonded to each other over their opposing surfaces.

According to one or more embodiments, the functional coating is composed of a second composition comprising at least one thermoplastic polymer P2 and at least one solid particulate filler F, wherein the particles of the at least one solid particulate filler F are distributed throughout the entire volume of the functional coating and wherein the functional coating and the profile of the sealing element are indirectly bonded to each other over their opposing surfaces through a layer of adhesive or a layer of thermoplastic material. Preferably, the layer of thermoplastic material comprises at least one thermoplastic polymer P, which is miscible with the at least one thermoplastic polymer P1 contained in the profile of the sealing element. More preferably, the at least one thermoplastic polymer P is weldable with the at least one thermoplastic polymer P1. The polymers being "weldable" with each other means here that a thermoplastic layer composed of the at least one thermoplastic polymer P can be homogenously joined by heat welding with another thermoplastic layer composed of the at least one thermoplastic polymer P1.

Preferably, the second composition is a heterogeneous mixture of at least two discrete phases, in particular a continuous thermoplastic polymer phase and a discontinuous solid filler phase. The continuous thermoplastic polymer phase comprises the at least one thermoplastic polymer P2 and optionally one or more other polymer materials and/or additives that can be mixed or interspersed sufficiently with thermoplastic polymers so as to essentially constitute a single "thermoplastic polymer phase". The thermoplastic polymer phase is characterized as generally being capable of forming a melt by heating to above a specified temperature and then re-solidifying when cooled sufficiently. Due to the presence of the thermoplastic phase, the functional coatings according to these embodiments can be bonded to other thermoplastic layers by heat-welding provided that the thermoplastic polymers in the two layers are compatible with each other.

The discontinuous solid filler phase comprises the at least one solid particulate filler F, which may be present in the second composition as individual particles or as aggregates of one or more particles. These are at least partially, preferably completely surrounded by the continuous thermoplastic phase. In case the second composition contains one or more mineral binders, such as cement, it is essential that these do not form interconnected solid networks of hydrated mineral binders. It may be preferable that the functional coating is essentially free, more preferably completely free, of interconnected solid networks of hydrated mineral binders. The particles of the at least one solid particulate filler F will not generally undergo a phase change to form a melt. Instead, the particles will remain as a discrete discontinuous solid phase interspersed throughout and among the continuous thermoplastic phase.

Preferably, the functional coating is composed of a homogeneously mixed mixture of the second composition. A "homogeneously mixed mixture" refers in the present document to compositions, in which the individual constituents are distributed substantially homogeneously in the composition. A homogeneously mixed mixture of the second composition comprising the at least one thermoplastic polymer P2 and the at least one solid particulate filler F refers, therefore, to a composition in which the particles of solid filler component F are homogeneously/uniformly distributed in the continuous phase composed of the thermoplastic polymer component P2. For a person skilled in the art it is clear that within such homogeneously mixed compositions there may be regions formed, which have a slightly higher concentration of one of the components than other regions and that a 100% homogeneous distribution of all the components is generally not achievable. Such mixed compositions with "imperfect" distribution of constituents, however, are also intended to be included by the term "homogeneously mixed composition" in accordance with the present invention.

The at least one solid particulate filler F is preferably an inorganic filler, more preferably an inorganic filler selected from the group consisting of mineral binders and inert mineral fillers.

The term "inert mineral filler" designates in the present document mineral fillers, which, unlike mineral binders are not reactive, i.e. do not undergo a hydration reaction in the presence of water. Suitable inert mineral fillers include sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term "sand" designates in the present document mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%.

By calcium carbonate as inert mineral filler is understood in the present document calcitic fillers produced from chalk, limestone or marble by grinding and/or precipitation.

The amount of the at least one thermoplastic polymer P2 and the amount of the at least one solid particulate filler F in the second composition is not particularly restricted. However, using high amounts of solid particulate fillers typically results in increased stiffness of the functional coating, which may not be desired. Therefore it may be preferable that the at least one solid particulate filler F is present in the second composition in an amount of not more than 90 wt.-%, more preferably not more than 80 wt.-%, even more preferably not more than 75 wt.-%, most preferably not more than 65 wt.-%, based on the total weight of the second composition.

According to one or more embodiments, the second composition comprises:

a) 10-90 wt.-%, preferably 25-75 wt.-%, more preferably 35-65 wt.-% of the at least one thermoplastic polymer P2 and b) 10-90 wt.-%, preferably 25-75 wt.-%, more preferably 35-65 wt.-% of the at least one solid particular filler F, said proportions being based on the total weight of the second composition.

The at least one solid particulate filler F is preferably in the form of finely divided particles. According to one or more embodiments, the median particle size $d_{50}$ of the at least one solid particulate filler F is 1.0-300.0 μm, more preferably 1.5-250.0 μm, even more preferably 2.0-200.0 μm, most preferably 2.0-100.0 μm. It may be preferable that less than 40 wt.-%, more preferably less than 30 wt.-%, even more preferably less than 20-wt.-%, most preferably less than 10 wt.-% of the particles of the at least one solid particulate filler F have a particle size of less than 2.5 μm and/or that less than 40 wt.-%, more preferably less than 30 wt.-%, even more preferably less than 20-wt.-%, most preferably less than 10 wt.-% of the particles of the at least one solid particulate filler F have a particle size of above 100 μm.

According to one or more embodiments, the overall particle size of the solid particulate filler F (of at least 98% of the particles) is below 250 μm, more preferably below 200 μm, even more preferably below 100 μm.

According to one or more embodiments, the second composition comprises 10-90 wt.-%, preferably 25-75 wt.-%, more preferably 30-70 wt.-%, most preferably 35-65 wt.-%, based on the total weight of the second composition, of at least one mineral binder selected from the group consisting of hydraulic, non-hydraulic, latent hydraulic, and pozzolanic binders.

In case the at least one solid particulate filler F contained in the second composition comprises or consists of one or more mineral binders, it may be preferable that these mineral binders remain in a substantially non-hydrated state at least until the functional coating is contacted with a composition containing water, such as with a fresh cementitious composition. In case the functional coating contains hydrated mineral binders, for example, if the at least one solid particulate filler F contains comminuted concrete, it may furthermore be preferable that these do not form interconnected solid network of hydrated mineral binders. The presence of such solid networks of hydrated mineral binders in the functional coating could significantly reduce the flexibility of the sealing element, which may be desired. It has been also found out that the mineral binders contained in the functional coating typically remain in a substantially non-hydrated state even if the sealing element is stored for several weeks at normal room temperature and relative humidity of 50%.

According to one or more embodiments, the second composition comprises 10-90 wt.-%, preferably 25-75 wt.-%, more preferably 30-70 wt.-%, most preferably 35-65 wt.-%, based on the total weight of the second composition, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the second composition comprises 10-90 wt.-%, preferably 25-75 wt.-%, more preferably 30-70 wt.-%, most preferably 35-65 wt.-%, based on the total weight of the second composition, of cement or Portland cement clinker.

According to one or more embodiments, the second composition comprises 1-60 wt.-%, preferably 2.5-55 wt.-%, more preferably 5-50 wt.-%, most preferably 10-40 wt.-%, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, and 1-60 wt.-%, preferably 2.5-55 wt.-%, more preferably 5-50 wt.-%, most preferably 10-40 wt.-%, of at least one mineral binder selected from the group consisting of hydraulic, non-hydraulic, latent hydraulic, and pozzolanic binders, preferably cement or Portland cement clinker, all proportions being based on the total weight of the second composition.

In embodiments, in which the functional coating is composed of the second composition, it is preferred that the at least one thermoplastic polymer P2 is miscible with the at least one thermoplastic polymer P1 contained in the profile of the sealing element. More preferably, the at least one thermoplastic polymer P2 is weldable with the at least one thermoplastic polymer P1. The polymers being "weldable" with each other means here that a thermoplastic layer composed of the at least one thermoplastic polymer P2 can be homogenously joined by heat welding with another thermoplastic layer composed of the at least one thermoplastic polymer P1.

Suitable thermoplastic polymers P2 can have a melting point ($T_m$), for example, in the range of 25-250° C., preferably 55-225° C., more preferably 60-200° C., most preferably 65-150° C. The glass transition temperature ($T_g$) of the at least one thermoplastic polymer P2 is preferably below the temperatures occurring during the use of the sealing element. It may therefore be advantageous that the $T_g$ of the at least one thermoplastic polymer P2 is below 0° C., more preferably below −15° C., most preferably below −30° C.

The at least one thermoplastic polymer P2 is preferably selected from the group consisting of ethylene—vinyl acetate copolymers (EVA), ethylene—acrylic ester copolymers, ethylene—α-olefin copolymers, ethylene—propylene copolymers polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (FIB). Furthermore, it may be preferable that the at least one thermoplastic polymer P2 is selected from the group consisting of low-density polyethylene, linear low-density polyethylene, high-density polyethylene, ethylene—vinyl acetate copolymer (EVA), ethylene—acrylic ester copolymers, ethylene—α-olefin copolymers, and ethylene—propylene copolymers.

It may be preferable that the second composition further comprises at least one surfactant. The term "surfactant" refers in the present document to surface tension lowering substances, which are usually organic compounds containing both hydrophobic and hydrophilic groups. Based on the charge of the hydrophilic group the surfactants are classified to anionic, cationic, amphoteric, non-ionic surfactants. It is believed that the presence of surfactants in the functional coating lowers the surface tension of water contained in a fresh cementitious composition, which further enhances the ability of the fresh cementitious composition to wet the surface of the functional coating and to form an interlocking mechanical bond between the sealing element and the cementitious composition after hardening.

According to one or more embodiments, the second composition further comprises at least one surfactant selected from the group consisting of anionic, cationic, amphoteric, non-ionic, and polymeric surfactants.

Examples of suitable anionic surfactants include surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of suitable cationic surfactants include quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of suitable amphoteric surfactants include amphoteric electrolytes such as aminocarboxylic acids and betaines.

Examples of suitable non-ionic surfactants include ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth)acrylic acids with polyalkylene glycols or aminopolyalkylene glycols, which at most may be tacked at one end with alkyl groups.

Polymeric surfactants can be divided into two groups of compounds. The first group includes comb or rake polymers where there is an organic polymeric chain with hydrophobic groups at regular intervals along the chain and hydrophilic groups at random or regular intervals along that chain. The second group of polymeric surfactants includes block copolymers where there are blocks of hydrophobic groups (B) and blocks of hydrophilic groups (A) usually in A-B-A configuration. Certain polymeric surfactants such as ethylene oxide-propylene oxide copolymer surfactants can also be classified as non-ionic surfactants.

Preferably, the at least one surfactant, if used, is present in the second composition in an amount of at least 0.05 wt.-%, based on the total weight of the second composition. It may also be preferred that the at least one surfactant, if used, is present in the second composition in an amount of 0.05-5.0 wt.-%, more preferably 0.1-4.0 wt.-%, even more preferably 0.1-3.0 wt.-%, most preferably 0.25-2.0 wt.-%, based on the total weight of the second composition.

Preferably, the at least one surfactant is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

Examples of suitable commercially available glycerol monostearates include Dimodan HP (from Danisco).

Examples of suitable polycarboxylate ethers include polycarboxylate ether-based superplasticizers (PCEs), which are composed by a methoxy-polyethylene glycol copolymer (side chain) grafted with methacrylic acid copolymer (main chain). Suitable commercially available polycarboxylate ether-based superplasticizers include Viscocrete® Polymer PC-2, Viscocrete® Polymer RMC-2, and Cemerol® R-750 MC (from Sika).

Examples of suitable polyether-modified polysiloxanes include polyetherpolysiloxane copolymers. Suitable commercially available polyether-modified polysiloxanes include Tegostab B8870 (from Evonik).

Examples of suitable commercially available polyalkylene oxide siloxanes include Niax L-1500 (from Momentive).

Examples of suitable hydroxyethyl amines include bis(2-hydroxyethyl) amines, which are commercially available as Armostat 300 (from Akzo Nobel).

Examples of suitable commercially available erucamides and stearyl stearamides include Kemamide E180 and Kemamide S180 (from PMC Biogenix).

Examples of suitable alkali metal alkanesulfonates include sodium alkanesulfonates, which are commercially available as Armostat 3002 (from Akzo Nobel) and Loxiol 93P (from Emery Oleochemicals).

Examples of suitable commercially available alkylarylsulfonates include ZetaSphere 2300, 3100 and 3700 (from Airproducts).

According to one or more embodiments, the second composition comprises at least one surfactant selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates, wherein the at least one surfactant is present in the second composition in an amount of 0.05-5.0 wt.-%, preferably 0.1-4.0 wt.-%, more preferably 0.1-3.0 wt.-%, most preferably 0.25-2.0 wt.-%, based on the total weight of the second composition.

The second composition can comprise, in addition to the at least one thermoplastic polymer P2, the at least one solid particulate filler F, and the at least one surfactant, additives such as UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids.

According to one or more further embodiments, the functional coating comprises a second adhesive and at least one thermoplastic polymer P3, which changes its consistency under the influence of highly alkaline medium. According to one or more embodiments, the second adhesive is a pressure sensitive adhesive (PSA). Suitable pressure sensitive adhesives to be used as the second adhesive include the ones discussed above suitable as the first adhesive.

A highly alkaline medium is understood as having a pH of 9 to 14, preferably of 11 to 13. The functional coating comprising the at least one thermoplastic polymer P3 is preferably inert to aqueous solutions having a pH value in the acid to slightly basic range (such as rain, for example). When the functional coating comes into contact with highly alkaline solutions such as a fresh cementitious composition, a chemical reaction occurs, resulting in, for example, dissolution of the at least one thermoplastic polymer P3 in the highly alkaline solution.

Thermoplastic polymers that change their consistency under the influence of highly alkaline media are well known to a person skilled in the art. One example of such polymers is polyvinyl alcohols, which partially dissolve under the influence of aqueous media. Such vinyl alcohols are used, for example, for producing "soluble bags" for packaging concrete additives, since these "soluble bags" can be added directly to concrete mixtures. Another example of polymers that change consistency under highly alkaline conditions is copolyesters, since the ester functionality of these polymers hydrolyzes in highly alkaline media, causing the polymers to break down. A further example of polymers that change consistency under the influence of highly alkaline media is polyvinyl acetates and copolymers thereof, since the vinyl acetate units within the polymers are subject to hydrolysis in highly alkaline media, and are thereby converted to polyvinyl alcohols. These are readily soluble in water, so that the polymer dissolves completely in the highly alkaline medium.

Particularly suitable polyvinyl alcohols include those having a hydrolysis degree of more than 50 mol.-%, preferably 70-100 mol.-%, more preferably 80-97.5 mol.-%, most preferably 85-95 mol.-%. These types of polyvinyl alcohols are described, for example, in DE 10 2007 026 166 A1. The term "degree of hydrolysis" as used herein refers to the proportion of the acetate groups in the polyvinyl acetate that have been converted to alcohol groups to form the polyvinyl alcohol.

Suitable copolymers of vinyl acetate include the ones containing relatively low amount of non-polar monomers, such as ethylene monomers. Copolymers of vinyl acetate containing high amount of non-polar monomers are not suitable since these do change their consistency under the influence of highly alkaline medium. Therefore, ethylene vinyl acetate copolymers having vinyl acetate concentrations in range of 5-40 mol.-%, are not suitable for use as the at least one thermoplastic polymer P3. Suitable copolymers of vinyl acetate include those containing not more than 50 mol.-%, preferably not more than 30 mol.-%, more preferably not more than 20 mol.-% of non-polar monomers, based on the total amount of all monomers in the copolymer.

Further suitable thermoplastic polymers that change their consistency under the influence of highly alkaline media include thermoplastic copolyesters, in particular thermoplastic copolyesters based on polyethylene terephthalate. These have the advantage over polyvinyl acetates or copolymers of vinyl acetate that the hydrolysis takes place in the polymer backbone, whereas in case of polyvinyl acetate, only the side chains of the polymer can be hydrolyzed. Thermoplastic copolyesters are also preferred since a substantial change in consistency of the polymer can be achieved with a relatively low amount of hydrolysis whereas in case of polyvinyl acetate, essentially a complete hydrolysis of the acetate groups is required for the substantial change in consistency of the polymer.

Preferably, the at least one thermoplastic polymer P3 has a relatively low melting point ($T_m$), such as a melting point in the range of 60-120° C., more preferably 70-110° C., most preferably 75-100° C.

Preferably the at least one thermoplastic polymer P3 is selected from the group consisting of polyvinyl alcohols, thermoplastic copolyesters, and copolymers of vinyl acetate.

In embodiments, in which the functional coating comprises the second adhesive and the at least one thermoplastic polymer P3, the functional coating can further comprise an additional thermoplastic polymer, which does not change its consistency in highly alkaline media. Advantageously, said additional polymer has a melting point ($T_m$) above normal room temperature. Suitable additional thermoplastic polymers used in combination with the at least one thermoplastic polymer P3 include, for example, acrylic polymers, polyethylene homopolymers and ethylene copolymers, in particular ethylene-α-olefin copolymers, ethylene vinyl acetate copolymers.

According to one or more embodiments, the functional coating is composed of a single layer comprising the at least one thermoplastic polymer P3 and the second adhesive.

According to one or more further embodiments, the functional coating comprises a layer of the second adhesive and a protective film comprising the at least one thermoplastic polymer P3, wherein the protective film is coated on and at least partially covering the outer surface of a layer of the second adhesive opposite to the side of the profile of the sealing element. In these embodiments, the layer of the second adhesive is arranged between the protective film and the profile of the sealing element.

The preferences given above for the at least one thermoplastic polymers P, P1, P2, and P3, the at least one solid particulate filler F, and the at least one surfactant apply equally to all aspects of the present invention unless otherwise stated.

The preferred thickness of the functional coating depends on the embodiment of the sealing element and in particular, on the type of application. The functional coating may have a uniform thickness or the thickness may vary in the longitudinal and/or transverse direction of the sealing element. Depending on the embodiment of the sealing element, the functional coating may be in form a continuous layer of material or a discontinuous layer of material. The term "continuous layer" refers in the present document to layers consisting of one single area coated with the material whereas a "discontinuous layer" is considered to consist of several isolated areas coated with the material.

Preferably, the functional coating has a maximum thickness, determined by using the measurement method as defined in DIN EN 1849-2 standard, of 0.1-10.0 mm, more preferably 0.2-5.0 mm, even more preferably 0.25-2.5 mm, most preferably 0.3-2.0 mm. It may also be preferable that the functional coating has a minimum thickness, determined by using the measurement method as defined in DIN EN 1849-2 standard, of 0.05-2.0 mm, more preferably 0.05-1.5 mm, even more preferably 0.05-1.0 mm, most preferably 0.05-0.5 mm. Furthermore, it may be advantageous that the functional coating has an average thickness, calculated as arithmetic average of the maximum and minimum thicknesses, determined by using the measurement method as defined in DIN EN 1849-2 standard, of 0.075-2.5 mm, preferably 0.1-1.5 mm, even more preferably 0.1-1.0 mm, most preferably 0.1-0.5 mm.

The preferred dimensions the profile of the sealing element, such as thickness and width, depend mainly on the anticipated hydrostatic head of water against which the sealing element is installed in the concrete joint and on the size of the joint opening. It may, for example, be preferred that the profile of the sealing element has a total width in the range of 50-1500 mm, more preferably 100-1000 mm. The width of the profile of the sealing element is understood to mean the dimension of the sealing element, which is measured in direction of the width of the joint opening to be sealed.

The preferred dimensions of the center portion of the profile depend mainly on the embodiment of the center portion and dimensions of the size of the joint opening. It may, for example, be preferred that the center portion has a width in the range of 2.5-150 mm, more preferably 5-100 mm, most preferably 5-75 mm. The width of the center portion is understood to mean the dimension of the center portion, which is measured in direction of the width of the joint opening to be sealed.

The preferred dimensions of the first and second side portions of the profile depend mainly on the type of the application and on the size of the joint opening. It may, for example, be preferred that each side portion has a width in the range of 25-750 mm, more preferably 100-500 mm, most preferably 150-500 mm. The width of the side portions is understood to mean the dimension of the respective side portion, which is measured in direction of the width of the joint opening to be sealed The thickness of the profile may vary in the longitudinal and/or transverse direction of the sealing element. It may be preferred that the profile of the sealing element has a maximum thickness, determined by using the measurement method as defined in DIN EN 1849-2 standard, in the range of 1.0-25 mm, more preferably 2.5-15 mm. The term "thickness of the profile" designates in the present document the thickness of the side and center portions of the profile without the thickness of the functional coating or any other layer which may be present. In case the center portion of the profile is in a form of an expansion element, for example, in a form of a hollow profile, the "thickness of the profile" designates the thickness of the side portions without the center portion. It may also be preferable that the profile has a minimum thickness, determined by using the measurement method as defined in DIN EN 1849-2 standard, in the range of 0.25-20.0 mm, more preferably 0.5-15.0 mm.

The side portions of the profile may have higher thickness than the center portion or vice versa. The thickness of the side portions of the profile may also increase or decrease along the width of the side portions. According to one or more embodiments, the first and/or second side portions of the profile have a wedge-shaped cross-section, i.e. the thickness of the cross-section of the side portions changes in widthwise direction of the side portions. According to one or more embodiments, the thickness of the cross-section of first and second side portions increases from the center portion towards the extremities of the side portions.

The sealing element may further comprise a reinforcement layer in order to improve the dimensional stability of the sealing element. The reinforcement layer is preferably at least partially embedded into the functional coating and/or into the profile. Suitable reinforcement layers include, for example, layers of fiber materials. However, in case the center portion is in a form of an expansion element, it may be preferable that the sealing device does not comprise a reinforcing layer or that if the reinforcing layer is used it is not present in the center portion of the profile or in the functional coating covering the surfaces of the center portion.

Another subject of the present invention is a method for producing a sealing element according to the present invention, the method comprising steps of extruding and/or calendaring a first thermoplastic composition comprising the constituents of the profile of the sealing element and applying the functional coating(s) on at least one of the top and bottom major surfaces of the profile, preferably on at least on one of the top and bottom major surfaces of the first and/or second side portions of the profile.

The details of the method for producing a sealing element according to the present invention depend on the embodiment of the sealing element, in particular on the composition of the functional coating and whether it is directly or indirectly bonded to the profile of the sealing element.

According to one or more embodiments, the functional coating comprises the at least one thermoplastic polymer P2 and the at least one solid particulate filler F and the method comprises steps of extruding and/or calendaring and/or co-extruding a first thermoplastic composition comprising the constituents of the profile and a second thermoplastic composition comprising the constituents of the functional coating.

In case of the extrusion process, the method can comprise steps of extruding the first thermoplastic composition using a first extruder and extruding the second thermoplastic composition using a second extruder and bonding the thus obtained layers to each other using any conventional means, such as calendaring rolls or lamination wheels to form a composite article. This type of extrusion process may be particularly suitable for producing sealing elements comprising a center portion in form of a planar element or a center portion in form of an expansion element.

In case of a co-extrusion process, the method can comprise steps of co-extruding the first and second thermoplastic compositions through a common die to form a composite article and optionally employing spaced apart calender cooling rolls through which the composite article is drawn in order to ensure that the layers are bonded to each other and/or to control the thickness of the extruded layers, in particular the thickness of the functional coating. This type of co-extrusion process may be particularly suitable for producing sealing elements comprising a center portion in form of a planar element or a center portion in form a hollow profile having an open cross-section. In the latter case the co-extruded composite article can be subjected to a post-treatment step, in which the expansion element is formed in a folding process.

According to one or more embodiments, the method for producing a sealing element comprises steps of producing first and second composite articles having identical compositions using the methods as described above and bonding the composite articles to each other such that in the thus obtained sealing element, both top and bottom major surfaces of the first and second side portions of the profile are coated with the functional coating, i.e. the profiles of the first and second composite articles are bonded to each other to form a one single sealing element. The sealing elements produced by using the method according to these embodiments are particularly suitable for use as an internal waterstop. In case a sealing element with a center portion in form of an expansion element is to be produced with the above described method, the first and second composite articles can be first subjected to a thermoforming step, in which the center portion of the composite articles is shaped to form the "other half" of the expansion element (center bulb) followed by bonding of the first and second composite articles to other.

According to one or more further embodiments, the method for producing a sealing element comprises steps of producing first and second composite articles using the methods as described above, extruding a third thermoplastic composition comprising the constituents of the center portion of the profile, which is preferably in a form of a hollow profile having a closed cross-section, and bonding first and second composite elements to the center portion such that in the thus obtained sealing element the first and second composite articles extend outwardly from, and on opposite sides, of the center portion. The bonding of the composite articles to the center portion of the profile can be conducted by using any conventional means, such as by heat-welding.

According to one or more further embodiments, the method for producing a sealing element comprises steps of extruding and/or calendaring a first thermoplastic composition comprising the constituents of the profile, providing one or more composite articles composed of a functional coating and a connecting layer, and bonding the composite articles to the surfaces of the extruded profile via the connecting layers. The connecting layer can be a layer of adhesive or a layer of thermoplastic material or a combination thereof.

Another subject of the present invention is a method for sealing a joint between two sections of concrete using an internal waterstop, the method comprising steps of providing a sealing element according to the present invention and sequentially casting a first and second sections of concrete such that:
  the first side portion of the profile becomes embedded in the first section of concrete,
  the second side portion of the profile becomes embedded in the second section of concrete, and
  the center portion is positioned in the joint formed between the two concrete sections.

The first and second sections of concrete can form a part of any structural or civil engineering structure, which is to be sealed against moisture and water, such as a an aboveground or underground structure, for example a building, garage, tunnel, landfill, water retention, pond, or dike.

The details of the method depend on the type of the joint to be sealed, in particular if the joint to be sealed is an expansion joint or a contraction or construction joint. According to one on or more embodiments, the method for sealing a joint between two sections of concrete comprises steps of:
  i) Positioning the sealing element of the present invention such that the center portion of the profile is located between upper and lower parts of a split formwork,
  ii) Optionally securing the first side portion of the profile to one or more reinforcing steel bars,
  iii) Casting a first section of concrete such that the first side portion of the profile becomes embedded in concrete,
  iv) Casting a second section of concrete such that the second side portion of the profile becomes embedded in concrete.

Another subject of the present invention is a method for sealing a joint between two sections of concrete using an external waterstop, the method comprising steps of:
  i') Positioning a sealing element according to the present invention on a base onto which concrete is to be cast,
  ii') Casting a first and a second sections of concrete such that the center portion of the profile is located in or along the joint formed between the casted sections of concrete and the functional coating of the first side portion of the profile is directly connected to the surface of the first section of concrete and the functional coating of the second side portion of the profile is directly connected to the surface of the second section of concrete.

Another subject of the present invention is a sealed construction comprising two sections of concrete, a gap between the sections of concrete, and a sealing element according to the present invention located at the joint, the first side portion of the profile being bonded to the first section of concrete, the center portion of the profile being located in the gap or along the gap, and the second side portion of the profile being bonded to the second section of concrete.

According to one or more embodiments, the first side portion of the profile is embedded in the first section of concrete and the second side portion of the profile is embedded in the second section of concrete, wherein the center portion of the profile is located in a gap.

Still another subject of the present invention is a use of the sealing element according to the present invention for sealing of a joint in a concrete construction.

According to one or more embodiments, the sealing element according to the present invention is used as an external waterstop for sealing of a joint in a concrete construction, wherein at least one of the top and bottom major surfaces of the first and second side portions is at least partially covered with the functional coating.

According to one or more embodiments, the sealing element according to the present invention is used as an internal waterstop for sealing of a joint in a concrete construction, wherein the top and bottom major surfaces of the first and second side portions are at least partially covered with the functional coating.

According to one or more embodiments, the sealing element according to the present invention is used for sealing of a joint in a concrete structure, wherein the center portion of the profile is in a form of a planar element having top and bottom major surfaces neither of which is covered with the functional coating.

According to one or more embodiments, the sealing element according to the present invention is used for sealing of an expansion joint in a concrete structure, wherein the center portion of the profile is in a form of an expansion element, preferably in a form of an expansion element, which configured such that it is capable of stretching in lateral direction beyond the normal elastic ability of the material of which it is made of.

DETAILED DESCRIPTION OF THE DRAWINGS

FIG. 1 shows a cross-section of a sealing element (1) according to one embodiment of the present invention. In this embodiment the sealing element (1) comprises a profile (2) having a center portion (3) and first and second side portions (4, 5) extending outwardly from, and on opposite sides of, the center portion (3), wherein the extremities of the side portions (4, 5) are terminated by bulb-shaped protuberances. The center portion (3) of the profile (2) is in a form of a planar element and the top major surfaces of the side portions (4, 5) as well as the top major surface of the center portion (3) are substantially completely covered with the functional coating (6). These types of sealing elements are especially suitable for use as external waterbars.

Figure 2:
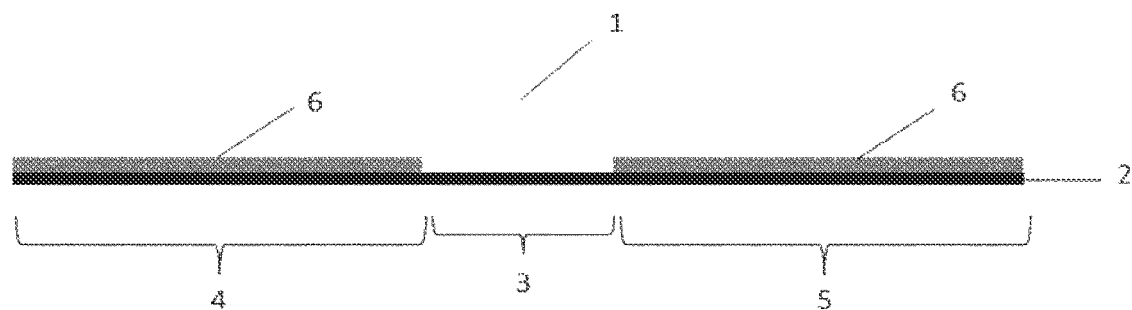
FIG. 2 shows a cross-section of a sealing element according to one embodiment of the present invention. In this embodiment, the side portions (4, 5) as well as the center portion (3) of the profile (2) are in form of planar elements. The top major surfaces of the side portions (4, 5) are substantially completely covered with the functional coating (6), whereas neither of the top and bottom major surfaces of the center portion (3) is covered with the functional coating (6).

FIG. 2 shows a cross-section of a sealing element according to one embodiment of the present invention. In this embodiment, the side portions (4, 5) as well as the center portion (3) of the profile (2) are in form of planar elements having top and bottom major surfaces. The top major surfaces of the side portions (4, 5) are substantially completely covered with the functional coating (6) whereas neither of the top and bottom major surfaces of the center portion (3) is covered with the functional coating (6). These types of sealing element are especially suitable for use as external waterbars.

Figure 3:
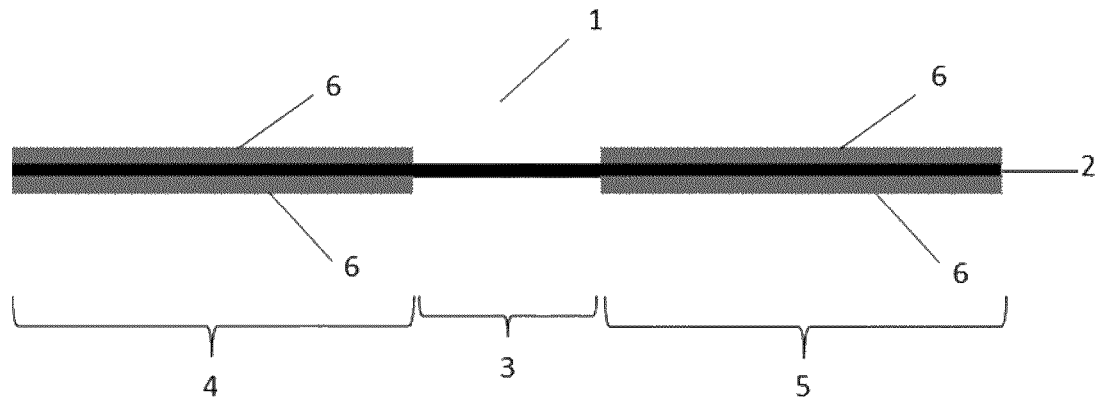
FIG. 3 shows a cross-section of a sealing element according to a further embodiment of the sealing element presented in FIG. 2. In this embodiment both top and bottom major surfaces of the side portions (4, 5) are substantially completely covered with the functional coating (6).

FIG. 3 shows a cross-section of a sealing element according to a further embodiment of the sealing element presented in FIG. 2. In this embodiment both top and bottom major surfaces of the side portions (4, 5) are substantially completely covered with the functional coating (6) whereas neither of the top and bottom major surfaces of the center portion (3) is covered with the functional coating (6). These types of sealing element are especially suitable for use as internal waterbars.

Figure 4:
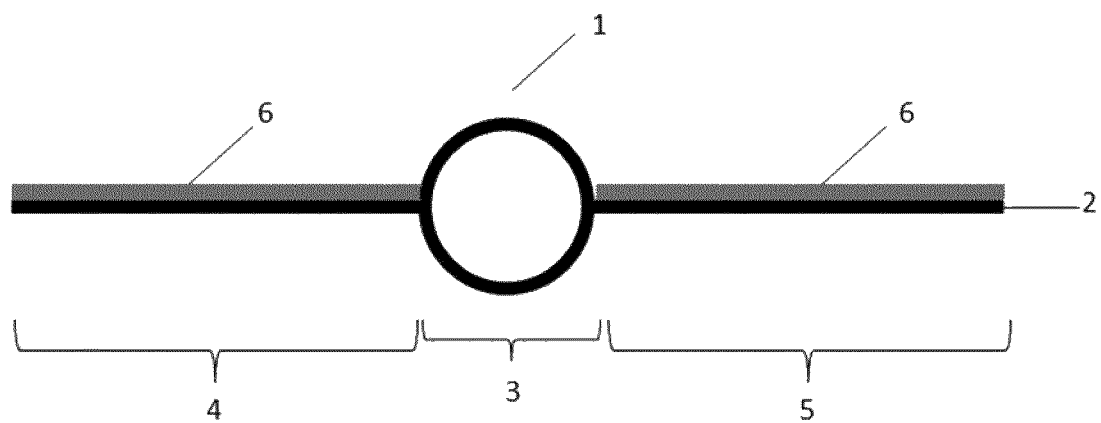
FIG. 4 shows a cross-section of a sealing element according to another embodiment of the present invention. In this embodiment, the center portion (3) of the profile (2) is in a form of an expansion element and the top major surfaces of the side portions (4, 5) of the profile (2) are substantially completely covered with the functional coating (6).

FIG. 4 shows a cross-section of a sealing element according to another embodiment of the present invention. In this embodiment, the sealing element (1) comprises a profile (2) having a center portion (3) and first and second side portions (4, 5) extending outwardly from, and on opposite sides of, the center portion (3), wherein the side portions (4, 5) are in form of planar elements having top and bottom major surfaces. The top major surfaces of the first and second side portions (4, 5) are substantially completely covered with the functional coating (6) and the center portion (3) is in a form of an expansion element having inner and outer major surfaces, wherein the expansion element is configured such that it is capable of stretching in lateral direction beyond the normal elastic ability of the material of which it is made of. Furthermore, the expansion element is in a form of a hollow profile having a circular-shaped (closed) cross-section. These types of sealing element are especially suitable for use as external waterbars, in particular for sealing of expansion joints.

Figure 5:
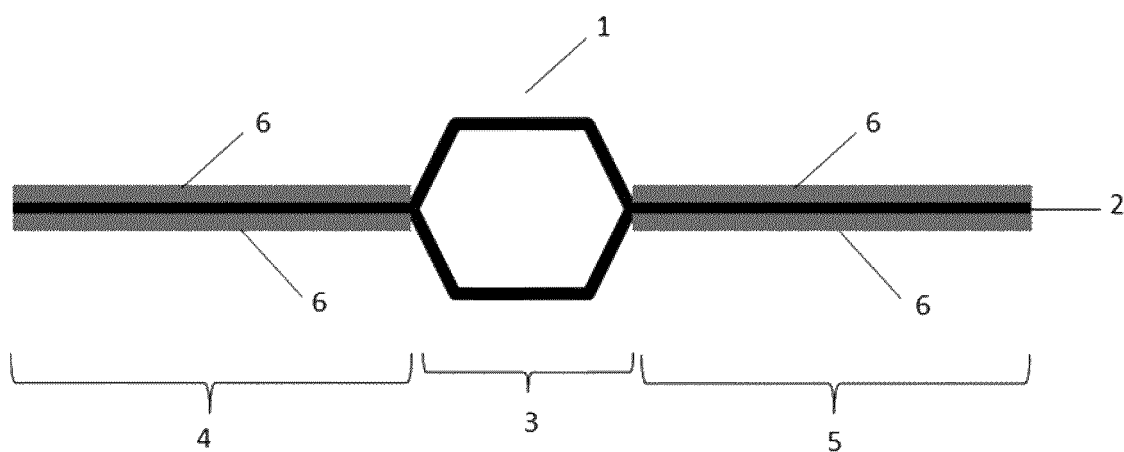
FIG. 5 shows a cross-section of a sealing element according to a further embodiment of the sealing element presented in FIG. 4. In this embodiment, the center portion (3) of the profile (2) is in a form of an expansion element and both top and bottom major surfaces of the side portions (4, 5) of the profile (2) are substantially completely covered with the functional coating (6).

FIG. 5 shows a cross-section of a sealing element according to a further embodiment of the sealing element presented in FIG. 4. In this embodiment, both top and bottom major surfaces of the first and second side portions (4, 5) are substantially completely covered with the functional coating (6). The center portion (3) is in form of an expansion element having inner and outer major surfaces neither of which is covered with the functional coating. The expansion element is in a form of a hollow profile having a hexagonal-shaped (closed) cross-section. These types of sealing element are especially suitable for use as internal waterbars, in particular for sealing of expansion joints.

Figure 6:
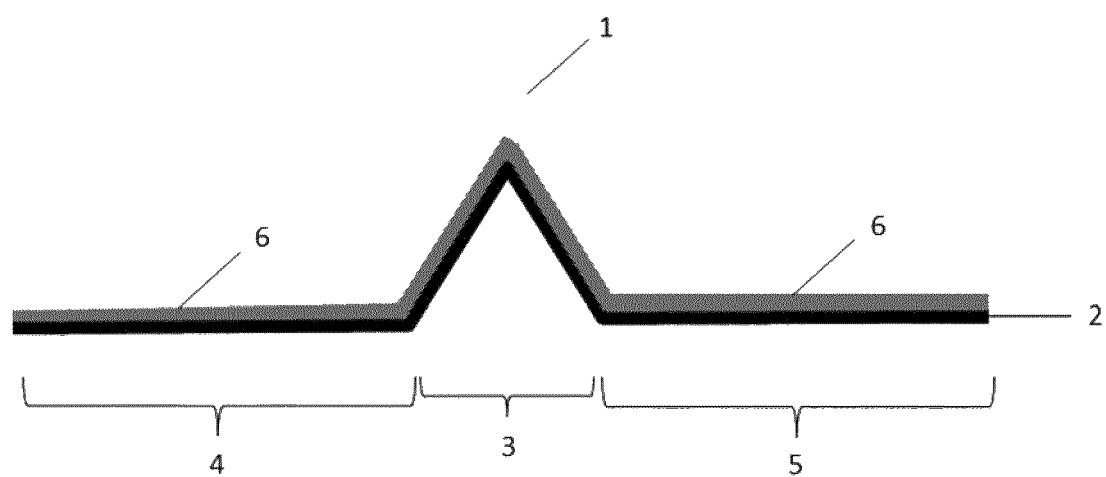
FIG. 6 shows a cross-section of a sealing element according to another embodiment of the present invention. In this embodiment, the center portion (3) of the profile (2) is in a form of an expansion element and the top major surfaces of the side portions (4, 5) of the profile (2) are substantially completely covered with the functional coating (6). The expansion element is in a form of a hollow profile having an open cross-section.

FIG. 6 shows a cross-section of a sealing element according to another embodiment of the present invention. In this embodiment, the sealing element (1) comprises a profile (2) having a center portion (3) and first and second side portions (4, 5) extending outwardly from, and on opposite sides of, the center portion (3), wherein the side portions (4, 5) are in form of planar elements having top and bottom major surfaces. The top major surfaces of the first and second side portions (4, 5) are substantially completely covered with the functional coating (6) and the center portion (3) is in a form of an expansion element having top and bottom major surfaces, wherein the expansion element is configured such that it is capable of stretching in lateral direction beyond the normal elastic ability of the material of which it is made of. Furthermore, the expansion element is in a form of a hollow profile having a V-shaped (open) cross-section. These types of sealing element are especially suitable for use as external waterbars, in particular for sealing of expansion joints.

Figure 7:
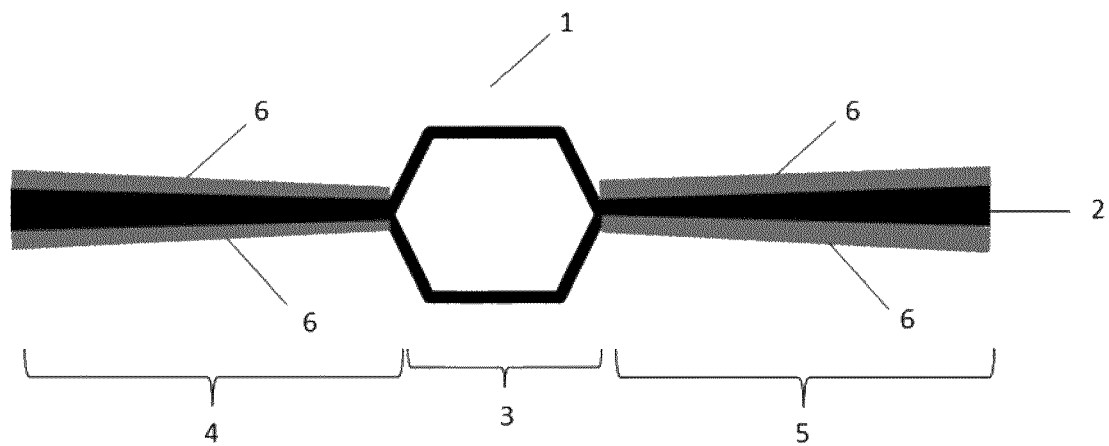
FIG. 7 shows a cross-section of a sealing element according to a further embodiment of the sealing element presented in FIG. 5. In this embodiment, the first and second side portions (4, 5) of the profile (2) have a wedge-shaped cross-section, i.e. the thickness of the cross-section of the side portions (4, 5) increases in longitudinal direction of the side portions.

FIG. 7 shows a cross-section of a sealing element according to a further embodiment of the sealing element presented in FIG. 5. In this embodiment, the first and second side portions (4, 5) of the profile (2) have a wedge-shaped cross-section, i.e. the thickness of the cross-section of the side portions (4, 5) increases in widthwise direction of the side portions. These types of sealing element are especially suitable for use as internal waterbars, in particular for sealing of expansion joints.

Figure 8:
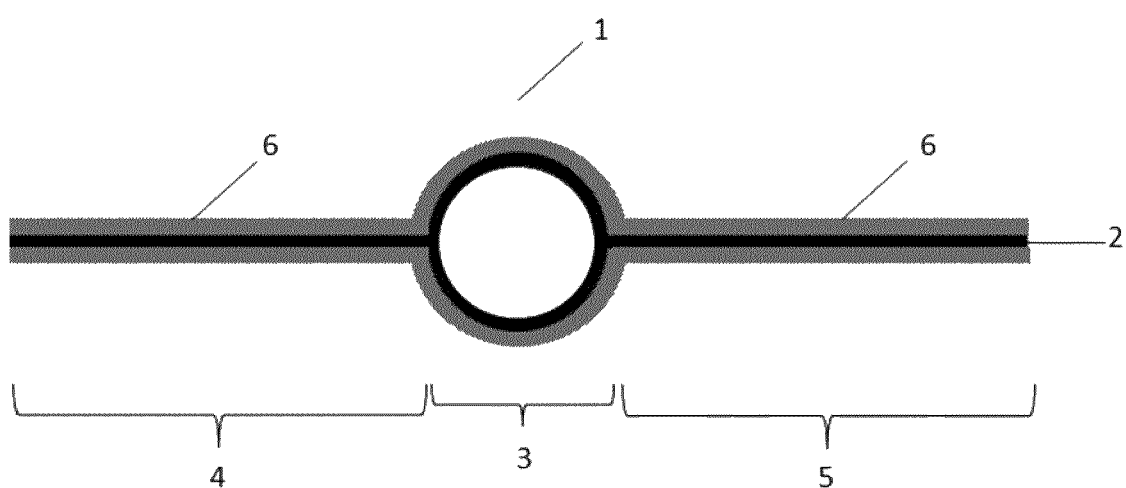
FIG. 8 shows a cross-section of a sealing element according to a further embodiment of the sealing element presented in FIG. 4. In this embodiment, the center portion (3) of the profile (2) is in a form of an expansion element and the top major surfaces of the side portions (4, 5) of the profile (2) are substantially completely covered with the functional coating (6). Furthermore, the outer major surface of the expansion element is substantially completely covered with the functional coating (6).

FIG. 8 shows a cross-section of a sealing element according to another embodiment of the sealing element presented in FIG. 4. In this embodiment, the top and bottom major surfaces of the first and second side portions (4, 5) are substantially completely covered with the functional coating (6). The center portion (3) is in a form of an expansion element having inner and outer major surfaces. The expansion element is in a form of a hollow profile having a circular-shaped (closed) cross-section and the outer major surface of the expansion element is substantially completely covered with the functional coating (6). These types of sealing element are especially suitable for use as internal waterbars, in particular for sealing of expansion joints.

Figure 9:
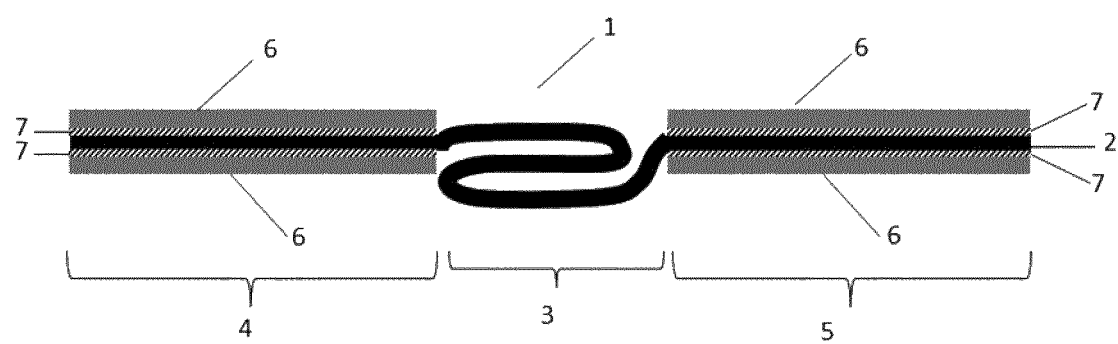
FIG. 9 shows a cross-section of a sealing element according to another embodiment of the present invention. In this embodiment, the center portion (3) of the profile (2) is in a form of an expansion element and both the top and bottom major surfaces of the side portions (4, 5) of the profile (2) are substantially completely covered with the functional coating (6). The expansion element is in a form of a hollow profile having an open "bellows-shaped" cross-section. The functional coating covering the top and bottom major surfaces of the first and second side portion and the profile of the sealing element are indirectly bonded to each other over their opposing surfaces though connecting layers (7).

FIG. 9 shows a cross-section of a sealing element according to another embodiment of the present invention. In this embodiment, the sealing element (1) comprises a profile (2) having a center portion (3) and first and second side portions (4, 5) extending outwardly from, and on opposite sides of, the center portion (3), wherein the side portions (4, 5) are in form of planar elements having top and bottom major surfaces. The top and bottom major surfaces of the side portions (4, 5) of the profile (2) are substantially completely covered with the functional coating (6) and the center portion (3) of the profile (2) is in a form of an expansion element, which is configured such that it is capable of stretching in lateral direction beyond the normal elastic ability of the material of which it is made of. The expansion element is in a form of a hollow profile having an open "bellows-shaped" cross-section having top and bottom major surfaces neither of which is covered with the functional coating. The functional coating covering the top and bottom major surfaces of the first and second side portion and the profile of the sealing element are indirectly bonded to each other over their opposing surfaces though connecting layers (7). These types of sealing element are especially suitable for use as internal waterbars, in particular for sealing of expansion joints.

The invention claimed is:

1. A sealing element for sealing of joints in concrete structures, the sealing element comprising:
  a profile having a center portion and first and second side portions on opposite sides of the center portion, the side portions having a top and bottom major surfaces, wherein
  at least one of the top and bottom major surfaces of the first and/or second side portions is at least partially covered with a functional coating which is operative to bond with a fresh cementitious composition casted against it and allowed to harden,
  wherein
    the center portion is in a form of a planar element having top and bottom major surfaces or
    the center portion is in a form of an expansion element,
  wherein the functional coating is composed of a composition comprising:
  a) 25-75 wt.-% of at least one thermoplastic polymer P2, and
  b) 25-75 wt.-% of at least one solid particulate filler F, based on a total weight of the composition, and
  wherein particles of the at least one solid particulate filler F are distributed throughout the entire volume of the functional coating.

2. The sealing element according to claim 1, wherein extremities of the side portions are terminated by bulb-shaped protuberances.

3. The sealing element according to claim 1, wherein the first and second side portions are in form of planar elements.

4. The sealing element according to claim 1, wherein the top and bottom major surfaces of the first and second side portions are at least partially covered with the functional coating.

5. The sealing element according to claim 1, wherein the center portion is in a form of the planar element having top and bottom major surfaces neither of which is covered with the functional coating or wherein the center portion is in a form of the expansion element, which is configured such that it is capable of stretching in lateral direction beyond the normal elastic ability of the material of which it is made of.

6. The sealing element according to claim 5, wherein the expansion element is in a form of a hollow profile having a closed or an open cross-section.

7. The sealing element according to claim 1, wherein the at least one solid particulate filler F is an inorganic filler selected from the group consisting of mineral binders and inert mineral fillers.

8. A method for producing a sealing element according to claim 1, the method comprising steps of extruding and/or calendaring a first thermoplastic composition comprising the constituents of the profile and applying the functional coating on at least one of the top and bottom major surfaces of the profile.

9. A method for sealing a joint between two sections of concrete using an internal waterstop, the method comprising steps of providing a sealing element according to claim 1 and sequentially casting a first and second sections of concrete such that:
  the first side portion of the profile becomes embedded in the first section of concrete,
  the second side portion of the profile becomes embedded in the second section of concrete, wherein
  the center portion is positioned in the joint formed between the two concrete sections.

10. A method according to claim 9 comprising steps of:
  i) positioning the sealing element such that the center portion of the profile is located between upper and lower parts of a split formwork,
  ii) optionally securing the first side portion of the profile to one or more reinforcing steel bars,
  iii) casting a first section of concrete such that the first side portion of the profile becomes embedded in concrete,
  iv) casting a second section of concrete such that the second side portion of the profile becomes embedded in concrete.

11. A method for sealing a joint between two sections of concrete using an external waterstop, the method comprising steps of:
  i') positioning a sealing element according to claim 1 on a base onto which concrete is to be cast,
  ii') casting a first and a second sections of concrete such that the center portion of the profile is located in or along the joint formed between the casted sections of concrete and the functional coating of the first side portion of the profile is directly connected to the surface of the first section of concrete and the functional coating of the second side portion of the profile is directly connected to the surface of the second section of concrete.

12. A sealed construction comprising two sections of concrete, a gap between the sections of concrete, and a sealing element according to claim 1 located at the joint, the first side portion of the profile being bonded to the first section of concrete, the center portion of the profile being located in the gap or along the gap, and the second side portion of the profile being bonded to the second section of concrete.

13. A method comprising sealing a joint in a concrete construction with a sealing element according to claim 1.

14. The sealing element according to claim 1, wherein the at least one thermoplastic P2 is selected from the group consisting of ethylene-α-olefin copolymers, ethylene vinyl acetate copolymers, ethylene-acrylic ester copolymers, ethylene-propylene copolymers, polypropylene (PP), polyethylene (PE), polyethylene terephthalate (PET), polystyrene (PS), polyamides (PA), chlorosulfonated polyethylene (CSPE), ethylene propylene diene rubber (EPDM), and polyisobutylene (PIB).

15. The sealing element according to claim 1, wherein the at least one thermoplastic P2 is selected from the group consisting of ethylene-α-olefin copolymers and ethylene vinyl acetate copolymers.

* * * * *